United States Patent Office.

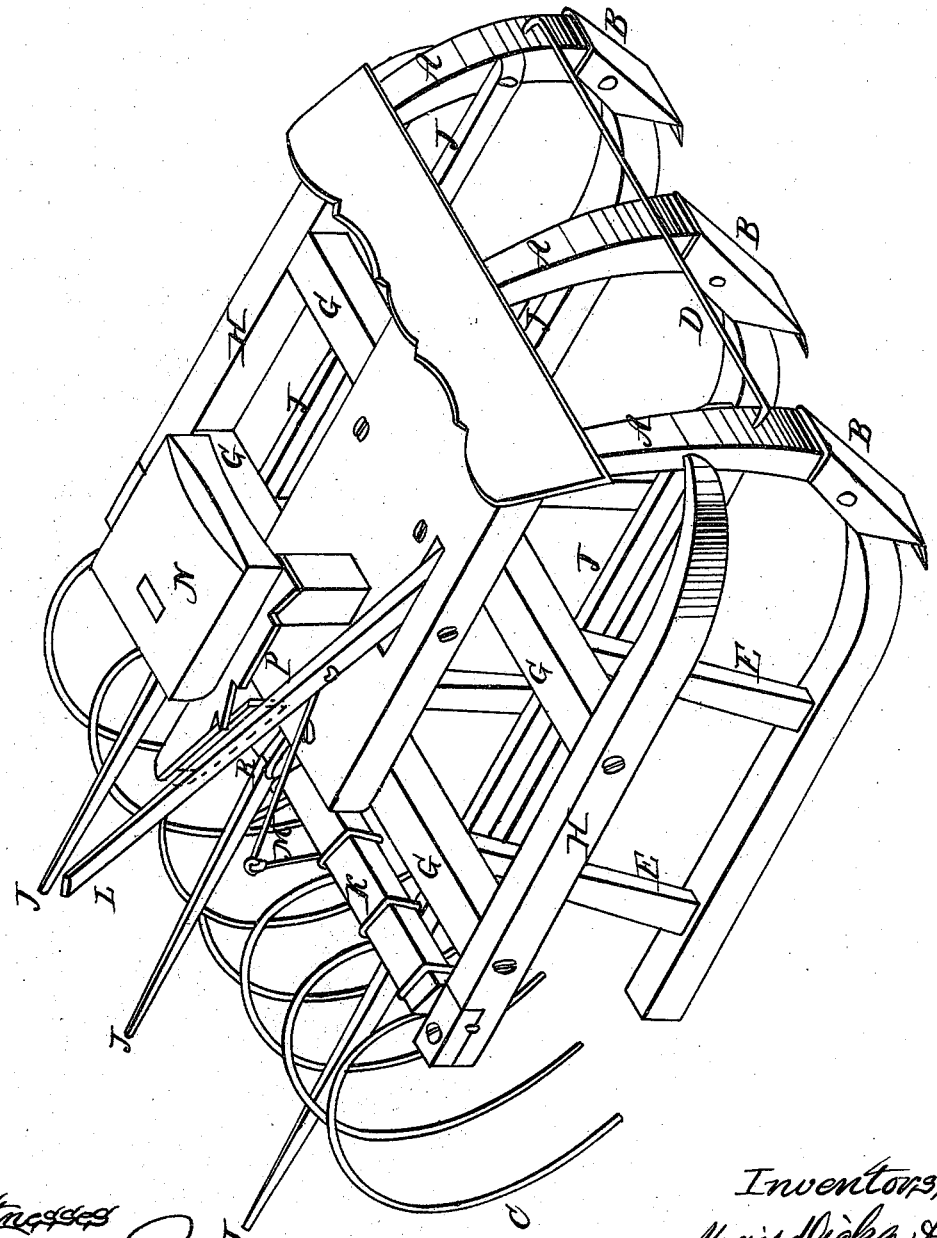

MORRIS DICKLE AND E. P. COWAN, OF OTTUMWA, IOWA.

Letters Patent No. 87,552, dated March 9, 1869.

---

IMPROVEMENT IN MACHINE FOR MARKING CORN-GROUND, WITH RAKE-ATTACHMENT

---

The Schedule referred to in these Letters Patent and making part of the same.

---

*To all whom it may concern:*

Be it known that we, MORRIS DICKLE and E. P. COWAN, of Ottumwa, Wapello county, State of Iowa, have invented an Improved Machine for Marking and Laying Off Corn-Ground, with Rake Attached; and we do hereby declare the following to be an exact description of the same, reference being had to the accompanying drawings, and to the letters of reference marked thereon, making a part of this specification.

The nature of our invention consists in the construction of a series of runners, each runner having a plow in front, for marking the ground. The plows or shovels are movable, and are taken off when the rake is to be used. The rake is also movable and adjustable, and the machine resembles a sled in shape.

A A A are the runners, curved upward in front as a sled.

On each runner, in front, is a shovel or marker, B, with its point extending down on a line with the bottom of the runner.

The marker B is attached to the runner firmly by screw-bolts, but is removed when the rake C is to be used.

A cross-bar, D, extends across the runners, in front, to brace them securely.

Each runner A has two uprights, E E, to support the body of the machine.

At the top of the uprights are two strong cross-braces, G G, into which the uprights are mortised, and on each end of the cross-braces G G, are side-braces H H, that are permanently fastened to the outside runners, and to each brace G, and extend back, the length of the runner A.

Longitudinal braces J J are likewise attached to each runner A, in front, and to each upright E, and extend back beyond and between the teeth of the rake C. These braces J, that are longitudinal, brace the body of the corn-marker lengthwise, and, being pointed and tapering at their outer ends, also serve to act as cleaners, to throw off the hay or grain from the rake when full.

At the rear ends of the braces H H is a revolving rake-head, K, extending across the machine, its journals working in the ends, between the two braces H H.

The steel-wire teeth of the rake C are permanently attached to the rake-head, and the rake is raised and lowered by means of a lever, L, and a rod, M, connecting the lever and rake-head, and the lever L is operated by the driver and adjusted at the side of the driver's seat N by a notched bar, P, so as to keep the rake up or down, as required.

A strap, R, made of bar-iron, surrounds the centre of the rake-head, and is firmly fastened to the bench of the seat and cross-brace G, to strengthen the rake-head, and keep the rake securely in its position when raking.

What we claim as our invention, and desire to secure by Letters Patent, is—

The construction of a series of runners, A A, forming a sled, having movable shovels B B on each runner, in front, and rake-cleaners J J, bracing the sled lengthwise, with a movable and adjustable rake, C, in the rear, when arranged and operated as herein described, and for the purposes set forth.

MORRIS DICKLE.
E. P. ×̇ COWAN.
<sub>his mark.</sub>

Witnesses:
W. T. JOHNSTON.
A. JOHNSTON.